United States Patent [19]
Yamada

[11] Patent Number: 5,594,888
[45] Date of Patent: Jan. 14, 1997

[54] CIRCUIT FOR SPEEDING UP A READ OPERATION FROM A ROM, THE ROM SERVING TO STORE PROGRAM DATA CORRESPONDING TO EVEN-NUMBERED ADDRESSES, THE CIRCUIT INCLUDING AN ADDRESS GENERATOR FOR GENERATING AN INCREMENTED ADDRESS TO THE ROM

[75] Inventor: Susumu Yamada, Moriguchi, Japan

[73] Assignee: Sanyo Electric Co., Ltd., Osaka, Japan

[21] Appl. No.: 312,631

[22] Filed: Sep. 27, 1994

[30] Foreign Application Priority Data

Sep. 29, 1993 [JP] Japan ................................ 5-243163

[51] Int. Cl.$^6$ ........................................ G06F 13/00
[52] U.S. Cl. ............................ 395/495; 395/496
[58] Field of Search ................... 395/405, 497, 395/403, 441, 421.03, 496, 481; 364/200

[56] References Cited

U.S. PATENT DOCUMENTS

| | | | |
|---|---|---|---|
| 4,086,629 | 4/1978 | Desyllas et al. | 395/421.03 |
| 4,319,324 | 3/1982 | Johnson et al. | 364/200 |
| 4,378,591 | 3/1983 | Lemay | 364/200 |
| 4,424,561 | 1/1984 | Stanley et al. | 364/200 |

*Primary Examiner*—David K. Moore
*Assistant Examiner*—Than V. Nguyen
*Attorney, Agent, or Firm*—Loeb & Loeb LLP

[57] ABSTRACT

The present invention is to improve the processing capability of a micro processor by speeding up a read operation of program memory stored in a ROM. The present invention comprises a first ROM for storing program data corresponding to even-numbered addresses and a second ROM for storing program data corresponding to odd-numbered addresses. It further comprises an address generator circuit for adding +1 to an address indicated by A1 – An when a least significant address bit A0 is 1. Hereby, when a present read operation is done for an odd-numbered address, an even-numbered address next to the foregoing odd-numbered address is simultaneously read to speed up read operation from a ROM.

3 Claims, 3 Drawing Sheets

CIRCUIT FOR SPEEDING UP A READ OPERATION FROM A ROM, THE ROM SERVING TO STORE PROGRAM DATA CORRESPONDING TO EVEN-NUMBERED ADDRESSES, THE CIRCUIT INCLUDING AN ADDRESS GENERATOR FOR GENERATING AN INCREMENTED ADDRESS TO THE ROM

BACKGROUND OF THE INVENTION

1. Field of the Invention

The present invention relates to a circuit for speeding up a read operation from a ROM from which program data is read by a control device such as a microcomputer and the like.

2. Prior Art

Microcomputers generally decode program data read from a ROM and execute various logical operations in conformity with the decoded program data. Programs stored in a ROM include varieties of instructions, say, those from a one-byte instruction where one instruction is executable only by decoding program data at each address to a plurality-of-bytes instruction where one instruction is executable by sequentially decoding program data at a plurality of addresses.

Such a microcomputer increments the counts of a program counter, and thereafter accesses ROM for each address. Accordingly, the one-byte instruction is executed by accessing an address in the ROM once, while the plural bytes instruction are executed by sequentially accessing a plurality of addresses in the ROM.

SUMMARY OF THE INVENTION

However, upon executing an instruction requiring a plurality of bytes, a plurality of addresses in a ROM must be accessed, so that a lot of time is required for reading program data stored in the ROM, resulting in increased processing time of a microcomputer.

The inconvenience is particularly severe in the so-called one-chip microcomputer where one semiconductor chip includes a microcomputer and a ROM both integrated thereon.

The speeding-up of read operation of a ROM is realizable provided the size of transistors which constitute the ROM are large-sized, but this inevitably increases the chip size. A one-chip microcomputer is often mounted on commercial apparatus, and it is therefore essential that it be both inexpensive and small-sized. Accordingly, use of large-sized chips should be avoided in such products.

On the other hand, a technique for interleaving a ROM may be considered, but this requires a large-scale control circuit and a greater overhead when an address to be executed branches. Although in one-chip microcomputers of a certain type, there are known ways of speeding up reading, decoding, and execution of program data by making use of a technique so-called 'alignment' in which the program data are arranged in a ROM at a predetermined byte interval, this produces a wasteful space between adjacent program data, resulting in lower operating efficiency of the ROM.

An object of the present invention is to solve the difficulties with the prior art, and to provide a circuit for speeding up a read operation for a ROM, realizing an excellent cost/performance ratio.

To achieve the above object, a read circuit for a ROM according to the present invention includes a first ROM for storing program data corresponding to even-numbered addresses, a second ROM for storing program data corresponding to odd-numbered addresses, an address generator for selectively adding +0 or +1 to an address indicated by A1 –An in response to the value of a least significant address bit A0 and generating a converted address AA1–AAn, a first address decoder for decoding the address AA1–AAn to access said first ROM, and a second address decoder for decoding the address A1–An to access said second ROM.

There will be described the function of the read circuit from a ROM of the present invention, constituted as aforementioned.

The second ROM is read in conformity with the address A1 –An as in the prior art. On the other hand, the first ROM is read in conformity with the address AA1–AAn converted from the address A1–An. The converted address AA1–AAn is generated by adding 0 or +1 to an address indicated by the address A1–An in response to the value of the address bit A0.

As a result, there can be read the next even-numbered address with respect to the first ROM when the second ROM is being read.

The above and other objects, features and advantages of the present invention will become more apparent from the following description when taken in conjunction with the accompanying drawings in which a preferred embodiment of the present invention is shown by way of illustrated example.

DETAILED DESCRIPTION OF THE PREFERRED EMBODIMENTS

In what follows, details of the present invention will be described with reference to the accompanying drawings in a comprehensively illustrated manner.

Figure 1:
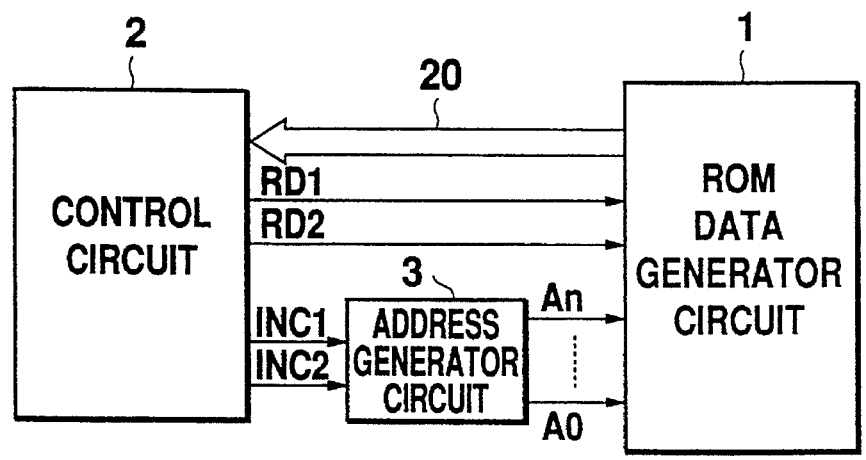
FIG.1 is a system diagram indicative of a read circuit from a ROM according to the present invention.

Referring to FIG. 1, there is illustrated a block diagram of a read circuit for a ROM according to the present invention.

As illustrated in FIG. 1, numeral (1) is a ROM data generator circuit which includes first and second ROMs describe later. These first and second ROMS store even-numbered and odd-numbered byte data with respect to the same base address. The base address means an address determined by ignoring the least significant address bit A0, and there is stored in the first ROM program data corresponding to an address where A0 is zero for the same base address while there is stored in the second ROM program data corresponding to an address where A1 is 1. More specifically, data of successive even-numbered addresses and odd-numbered addresses are read by applying the same base address to the first and second ROMs. The least significant address bit A0 can be defined as an offset value from the base address.

Numeral (2) is a control circuit, in which program data is decoded to execute various logic operations and in addition, control signals RD1, RD2, INC1, and INC2 are generated. The control signals RD1 and RD2 are signals to derive program data stored in the first and second ROMs, and the control signals INC1 and INC2 are signals to increment addresses in the first and second ROMs by +1 and +2.

Numeral (3) is an address generator circuit which serves to generate (n +1) bit address A0–An for accessing the first and second ROMs in response to the control signals INC1 and INC2.

Figure 2:
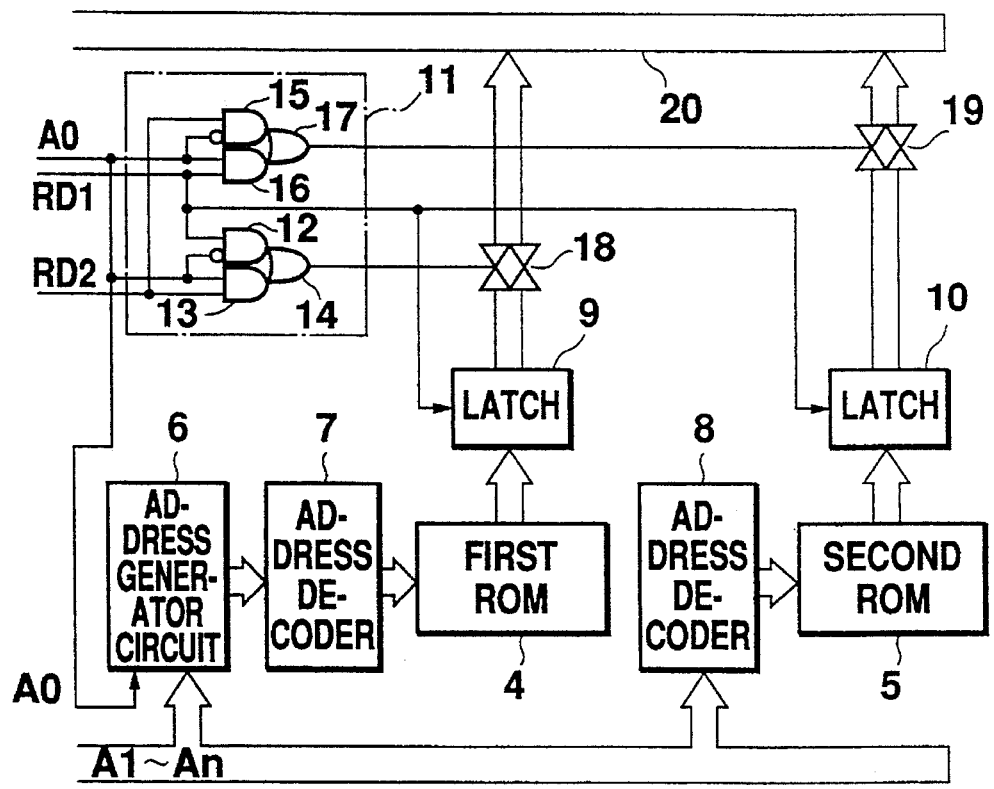
FIG.2 is a view illustrating the read circuit for a ROM of the present invention.

In the FIG.2, an embodied circuit of the ROM data generator circuit (1) is described.

As illustrated in FIG.2, numeral (4) is the aforementioned first ROM and (5) is the aforementioned second ROM. At the same base address in the first and second ROMs (4), (5), there are stored, respectively, program data of an even-numbered address and program data of an odd-numbered address greater than the Just mentioned even-numbered address by one.

Numeral (6) is an address generator circuit which generates the address A1–An as it is or an address thereof incremented by +1 in response to the value of the least significant address bit A0. More specifically, when A0 is 0, i.e., when the address A0–An indicates an even-numbered address, the address generator circuit (6) does not increment the address A1–An. In contrast, when A0 is 1, i.e., when the address A0–An indicates an odd-numbered address, the address generator circuit (6) generates an address by adding 1 to the address A1–An.

Designated at (7) is an address decoder which serves to decode the address A1–An generated from the address generator circuit (6) for actual access to the first ROM (4). Numeral (8) is also an address decoder which serves to decode the address A1–An generated from the address generator circuit (3) for access to the second ROM (5).

More specifically, when the address A0–An indicates an even-numbered address, the address decoders (7) and (8) access the same base address in the first and second ROMs (4) and (5). On the other hand, when the address A0–An indicates an odd-numbered address, the address decoder (8) accesses said base address at the second ROM (5) while the address decoder (7) accesses the next base address at the first ROM (4).

Numerals (9), (10) are latch circuits respectively, each of which serves to latch program data read from the first and second ROMs (4), (5) when the control signal RD1 is applied.

Numeral (11) is a switching circuit, which comprises first and second multiplexers for switching and outputting the control signals RD1 and RD2 in response to A0. The first multiplexer comprises AND gates (12), (13) and an OR gate (14). A0 is reversely inputted to one input of the AND gate (12), and to the other input of the AND gate (12) is coupled to the control signal RD1. To one input of the AND gate (13) A0 is inputted and to the other input the control signal RD2 is inputted. More specifically, the first multiplexer switches the control to output the control signal RD1 when A0 is 0 while it switches the control to output the control signal RD2 when A0 is 1.

Meanwhile, the second multiplexer comprises AND gates (15) and (16) and an OR gate (17). To one input of the AND gate (15), A0 is reversely inputted, and to the other input control signal RD2 is inputted. To one input of AND gate (16) A0 is inputted and to other input control signal RD1 is inputted. More specifically, the second multiplexer switches the control to output control signal RD2 when A0 is 0 while it switches the control to output control signal RD1 when A0 is 1. It is herein assumed that the control signal RD1 is generated before the control signal RD2 is generated.

Numerals (18) and (19) indicate transmission gates respectively, which are opened or closed in response to the switching outputs from the first and second multiplexers. More specifically, when the address A0–An indicates an even-numbered address, the transmission gate (18) is first opened to permit values in the latch circuit (9) to be transferred to a data bus (20), and then the transmission gate (19) is opened to permit values in the latch circuit (10) to be transferred to the data bus (20). Accordingly, program data stored in the first and second ROMs (4), (5) at the same base address are sequentially transferred to the data bus (20), whereby at least a two-byte instruction per one access is executable. Meanwhile, when the address A0–An indicates an odd-numbered address, the transmission gate (19) is first opened to permit values in the latch circuit (10) to be transferred to the data bus (20), and then the transmission gate (18) is opened to permit values in the latch circuit (9) to be transferred to the data bus (20). Accordingly, for the second ROM (5) an access following the actual base address is made and program data stored at that address is read, while for the first ROM (4) program data corresponding to the next converted base address are sequentially transferred to the data bus (20). It should also be noted that in this case at least a two-byte instruction per one access is executable.

Figure 3:
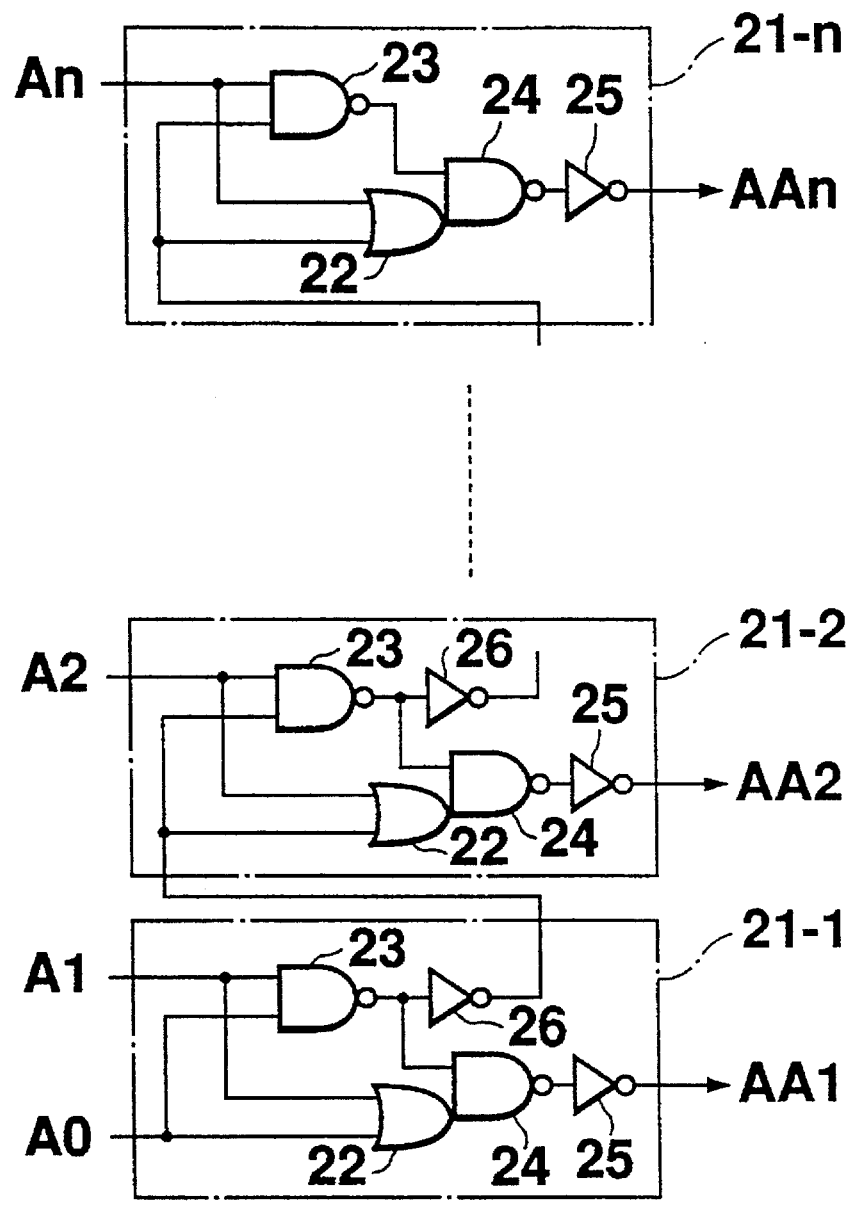
FIG.3 is a view illustrating an embodied circuit of an address generator circuit according to the present invention.

The FIG.3, illustrates an embodied circuit of the address generator circuit (6). Here, address AA1–AAn corresponds each to address A1–An.

As illustrated in FIG.3, numeral (21-1) is a group of logic circuits, which generates AA1 from A1 in response to A0. The logic circuit group (21-1) comprises an OR gate (22), NAND gates (23) and (24), and inverters (25) and (26). A0 is inputted to one input of the OR gate (22) and A1 is inputted to the other input. A0 is inputted to one input of the NAND gate (23) and A1 is inputted to the other input. An output of the OR gate (22) is connected with one input of the NAND gate (24) and an output of the NAND gate (23) is connected with the other input.

Likewise, numeral (21-2) is a grouping of logic circuits, which is to generate AA2 from A2 in response to a carry output from an inverter in the previous stage logic circuit group (21-1). Likewise, numeral (21-n) designates a grouping of logic circuits, which is to generate AAn from An in response to a carry output from the inverter (26) in the previous stage logic circuit group (21-(n–1)).

As a result, the address AA1–AAn becomes equal to the values of address A1–An when A0 is 0, while they take a value added by +1 to the address A1–An when A0 is 1.

Figure 4:
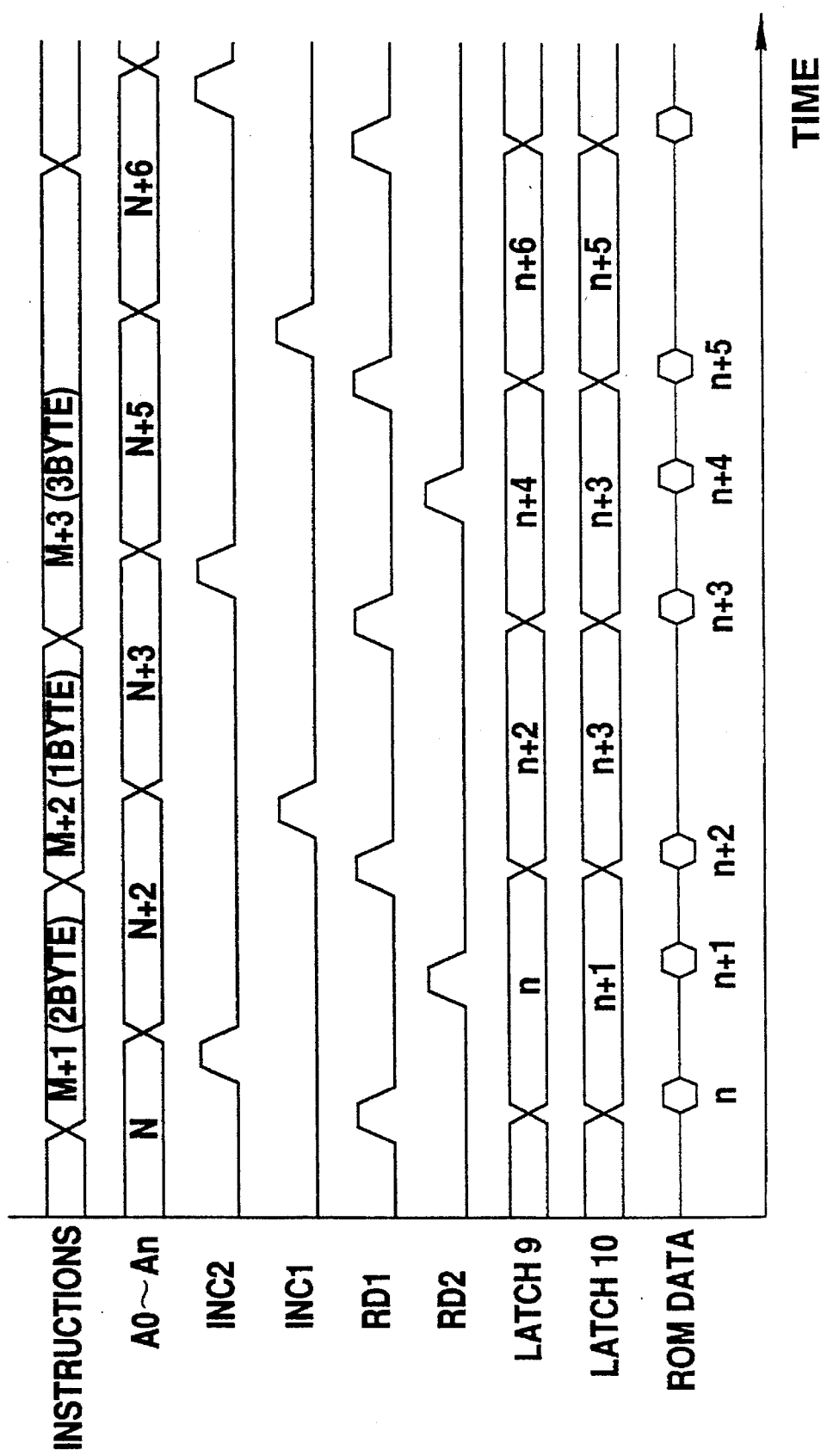
FIG.4 is a timing chart illustrating the operation of the present invention.

In the following, operation of the circuit illustrated in FIG.2 will be described with reference to a timing chart illustrated in FIG.4.

When a two-byte instruction (M+1) is executed once the address A0–An indicative of an even-numbered address N is fed, the same base address in the first and second ROMs (4) and (5) is accessed due to A0 being 0. Thereafter, control signal RD1 is generated whereby program data n and (n+1) read from the first and second ROMs (4), (5) are latched by the latch circuits (9), (10), respectively. First, the program data n latched by the latch circuit (9) are transferred to the data bus (20) through the transmission gate (18). Thereafter, control signal INC2 is generated whereby the address A0–An indicative of an even-numbered address (N +2) incremented by +2 is fed. Successively, the control signal RD2 is generated whereby the program data (n+1) latched by the latch circuit (10) are transferred to the data bus (20) through the transmission gate (19). In such a manner, the program data and (n+1) are sequentially transferred whereby the two byte instruction (M+1) is executed.

Next, when the one-byte instruction (M+2) is executed, once the address A0–An indicative of an even-numbered address (N+2) is fed, the same address in the first and second ROMs (4) and (5) is accessed due to A0 being 0. Thereafter, the control signal RD1 is generated whereby program data (n+2) and (n+3) read from the first and second ROMs (4) and (5) are latched by the latch circuits (9) and (10), respectively. The program data (n+2) latched by the latch circuit (9) are first transferred to the data bus (20) through the transmission gate (18). Successively, control signal INC1 is generated whereby the address A0–An indicative of an odd-numbered address (N+3) incremented by +1 are fed.

In such a manner, the program data (n+2) are transferred whereby the one-byte instruction (M+2) is executed.

Next, when a three-byte instruction (M+3) is executed, the address A0–An indicative of an odd-numbered address (N+3) is fed. Since A0 is 1, AA1–AAn are incremented, and an address corresponding to an even-numbered address (N+4) in the first ROM (4) and an address corresponding to the odd-numbered address (N+3) in the second ROM (5) are accessed, respectively. Thereafter, the control signal RD1 is generated whereby program data (n+4) and (n+3) read from the first and second ROMs (4) and (5) are latched by the latch circuits (9) and (10), respectively. The program data (n+3) latched by the latch circuit (10) are transferred to the data bus (20) through the transmission gate (19). Successively, as the control signal INC2 is generated, the address A0–An indicative of an odd-numbered address (N+5) incremented by +2 are generated. Thereafter, the control signal RD2 is generated whereby program data (n+4) latched by the latch circuit (9) are transferred to the data bus (20) through the transmission gate (18).

Although the odd-numbered address (N+5) is fed as above, since A0 is 1, an address corresponding to an even-numbered address (N+6) in the first ROM (4) and an address corresponding to an odd-numbered address (N+5) in the second ROM (5) are accessed. Thereafter, the control signal RD1 is generated whereby program data (n+6) and (n+5) read from the first and second ROMs (4), (5) are latched by the latch circuits, respectively. The program data (n+5) latched by the latch circuit (10) are transferred to the data bus (20) through the transmission gate (19).

In such a manner, the program data (n+3), (n+4), and (n+5) are sequentially transferred for execution of the three-byte instruction (M+3).

As described in detail above, according to the present invention, two successive series of program data can be read in response to the least significant address bit. Accordingly, a read time from a ROM is shortened and hence processing time of a microcomputer is reduced. The present invention is particularly effective for execution of a plural-bytes instruction.

Thereupon, even when there is any variation of the order of addresses to be executed owing to a branch instruction and the like, the reading speed of a read circuit from a ROM of the present invention is not affected by such variation. Therefore, the reading speed does not depend on addresses on which an interleaving system heavily depends, and a circuit arrangement of the present invention is substantially simplified compared with such an interleaving system. The reason is that the address generator circuit of the present invention simply adds 0 or +1 to any address outputted from a microcomputer, and is therefore fundamentally different in its arrangement from the interleaving system which is optimally designed on the assumption that addresses are sequentially increased.

Further, program data is not needed to be arranged in a ROM at a predetermined interval, so that there is no fear of lowering memory efficiency of a ROM.

With the above-mentioned features, the read circuit from a ROM of the present invention is particularly effective when it is included in an integrated circuit device such as a one-chip microcomputer. This is because the present invention not only has a decreased circuit scale in itself, but also accepts any ROM with more reduced reading speed so that it extends the process selection possibility of a ROM circuit.

The present invention thus satisfies conditions of low cost and minimized size which are required for integrated circuit devices mounted on commercial apparatuses, and therefore ensures an excellent cost/performance ratio.

As a matter of course, the use of the circuit of the present invention is not just limited to applications where it is included in ICs such as one-chip microcomputers and the like.

What is claimed is:

1. A read circuit for a ROM coupled to a data bus, the read circuit operable with a multibit address indicated by A0–An, the read circuit comprising:

a first ROM for storing program data corresponding to even-numbered addresses;

a second ROM for storing program data corresponding to odd-numbered addresses, so that when the first and the second ROMs are supplied with the same address the second ROM outputs program data which is subsequent to that of the first ROM;

an address generator for selectively adding 0 or +1 to an address indicated by A1–An in response to a least significant address bit A0 to generate a converted address AA1–AAn;

a first address decoder for decoding said address AA1–AAn to access said first ROM;

a second address decoder for decoding the address A1–An to access said second ROM;

a first latch for latching data read from said first ROM;

a second latch for latching data read from said second ROM;

a first gate for controlling transmission of data latched by said first latch;

a second gate for controlling transmission of data latched by said second latch;

a control circuit for generating a first control signal and a second control signal in a respective order for retrieving the program data stored in the first and second ROMs;and a switching circuit, responsive to a number of bytes necessary to execute one instruction, said first control signal, and said second control signal, for generating a first switching signal which enables either said first gate only or said first and second gates in respective sequence when said least significant address bit A0 is equal to a first logic state, and for generating a second switching signal which enables either said second gate only or said first and second gates in reverse sequence when said least significant address bit A0 is equal to a second logic state.

2. A read circuit for a ROM according to claim 1, wherein said control circuit generates a first increment signal for incrementing said address indicated by A0–An by +1 when one instructions is executed which requires one byte, and a second increment signal for first incrementing said address indicated by A0–An by +2 when one instruction is executed which requires two or more-byte data, so that said control circuit increments said address indicated by A0–An by +1 by means of said first increment signal and outputs either one of the data latched by said first and second latches to the data bus by means of one of said first and said second switching signals, when a one-byte instructions is executed, and said control circuits increments said address indicated by A0–An by +2 by means of said second increment signal and outputs data latched by said first and said second latches in respective sequence or in reverse sequence to the data bus by means of one of said first and said second switching signals, when a two or more-byte instruction is executed.

3. A read circuit for a ROM according to claim 2, wherein said control circuit generates said second increment signal prior to said first increment signal during execution of said two or more-byte instruction, such that said second control signal is generated, when a two-byte instruction is executed, after said second increment signal is generated and before a next instruction is executed, and said second control signal is generated, when a three-or-more-byte instruction is executed, after said second increment signal is generated for a first time and before remaining portions in the instruction are executed.

* * * * *